No. 615,835. Patented Dec. 13, 1898.
G. C. FLAGG.
CORN PLANTER.
(Application filed Sept. 6, 1898.)
(No Model.) 2 Sheets—Sheet 1.
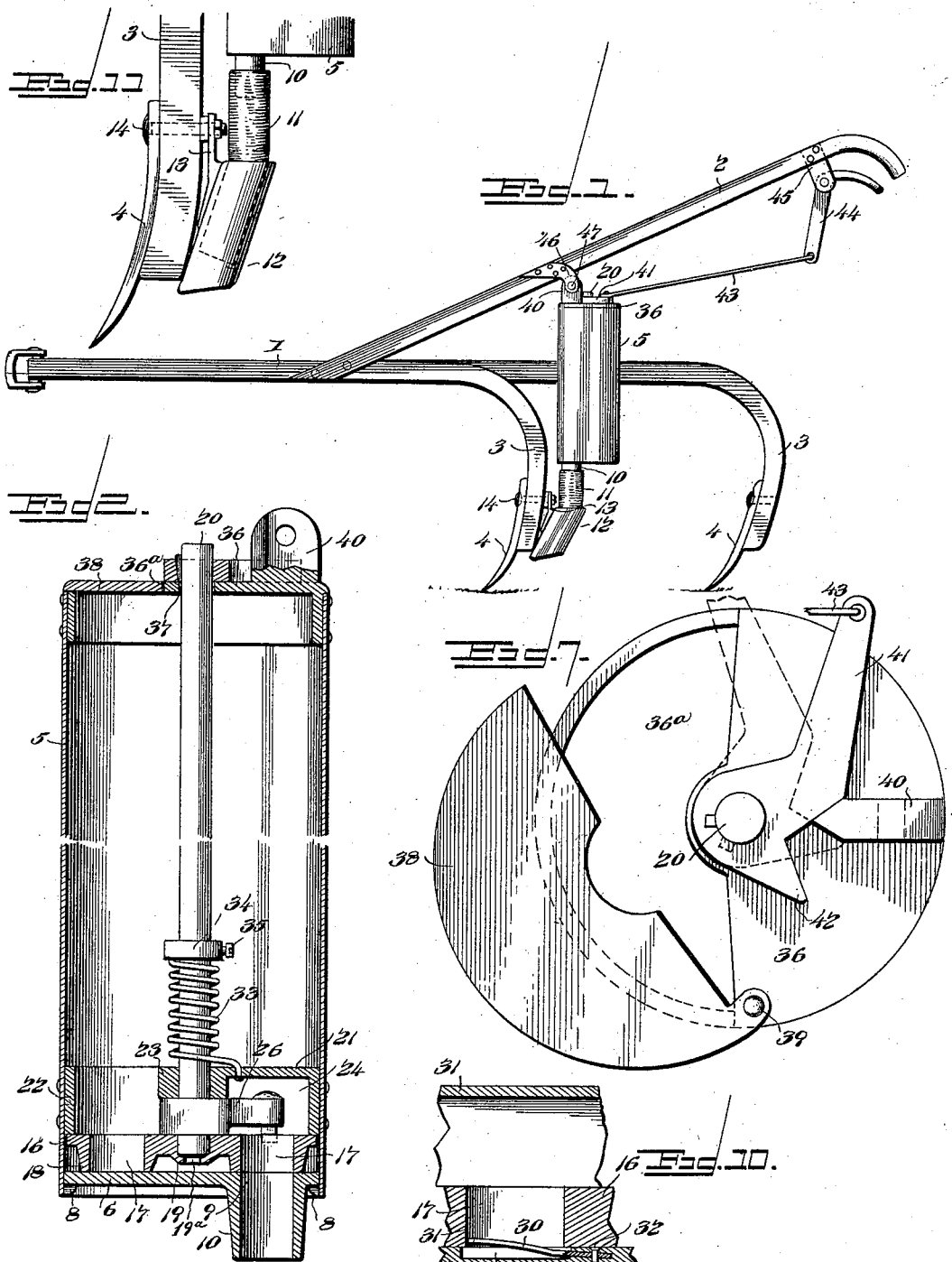
Witnesses George C. Flagg Inventor
By his Attorneys,

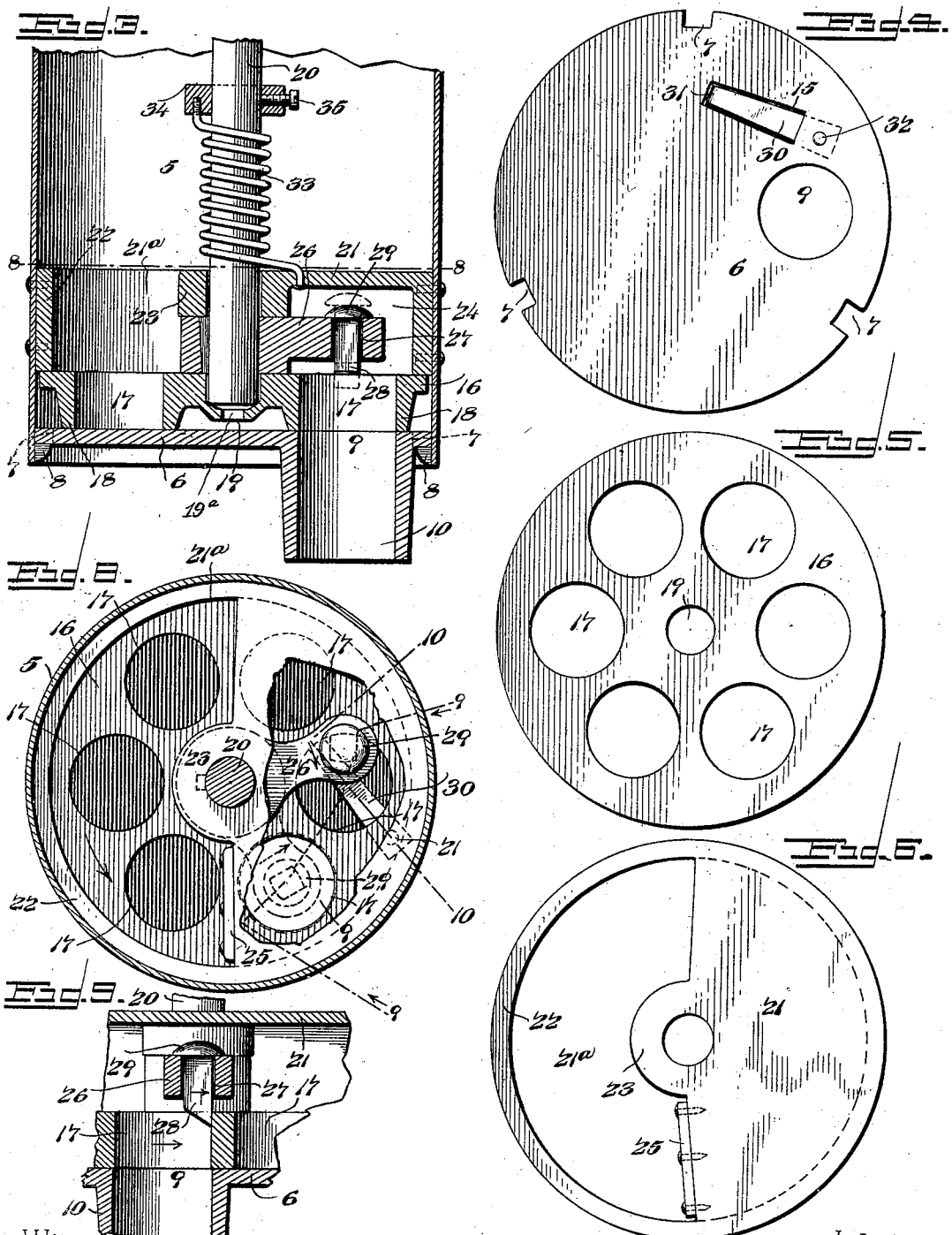

UNITED STATES PATENT OFFICE.

GEORGE C. FLAGG, OF LIBERAL, KANSAS, ASSIGNOR OF ONE-HALF TO EVERETT CARTER, OF BRYANT, ILLINOIS.

CORN-PLANTER.

SPECIFICATION forming part of Letters Patent No. 615,835, dated December 13, 1898.

Application filed September 6, 1898. Serial No. 690,282. (No model.)

*To all whom it may concern:*

Be it known that I, GEORGE C. FLAGG, a citizen of the United States, residing at Liberal, in the county of Seward and State of Kansas, have invented a new and useful Corn-Planter, of which the following is a specification.

In all corn-growing countries the necessity for replanting corn is conceded; but as the period when replanting should be done arrives at the time when the farmer should be plowing the corn for the first time the operation of replanting is usually neglected for want of time.

My invention aims to overcome this difficulty by the provision of a simple planter mechanism adapted for operation to replant vacant spaces in the row when the corn is being plowed or cultivated. Such planter mechanism may be used to this end without involving loss of time, and the vacant ground may be replanted to save the farmer the crop and without involving extra labor.

The primary object of this invention is to provide a planter mechanism which may be easily applied to ordinary cultivators for the purpose of planting corn or other grain, but which is designed to be used especially for replanting corn in the vacant spaces of the rows. The planter mechanism may be attached to a cultivator implement in advance of all the shovels and the seed deposited on the row to be covered by both cultivator-shovels, or the planter mechanism may be attached to the implement at a point in rear of the front shovel and the seed conveyed through a conducting hose or tube to a point close to the front shovel, so that the corn dropped on the row may be covered by the rear cultivator-shovel.

To attain these ends, the invention consists in the novel combination of elements and in the construction and arrangement of parts, which will be hereinafter fully described and claimed.

To enable others to understand the invention, I have illustrated the preferred embodiment thereof in the accompanying drawings, forming a part of this specification, and in which—

Figure 1 is a view of an ordinary cultivator with my planter mechanism applied thereto. Fig. 2 is an enlarged vertical sectional view through the hopper. Fig. 3 is an enlarged detail section through the lower part of the hopper. Fig. 4 is a plan view of the bottom plate to the hopper. Fig. 5 is a plan view of the seed-dropping plate. Fig. 6 is a plan view of the supporting-plate, which is contained within the hopper above the bottom and seed plates. Fig. 7 is a plan view of the head-plate of the hopper, illustrating the actuating-lever. Fig. 8 is a transverse section on the line 8 8 of Fig. 3, with certain of the parts in section and with the arrow indicating the direction in which the dropping-disk is driven. Fig. 9 is a vertical detail section on the line 9 9 of Fig. 8, showing the gravity feed-pawl. Fig. 10 is another vertical detail section, but on the plane indicated by the line 10 10 of Fig. 8 to show the check-spring by which the dropping-disk is arrested. Fig. 11 is an enlarged fragmentary detail of the delivery-shoe and parts associated therewith.

Like numerals of reference denote like and corresponding parts in each of the several figures of the drawings.

In Fig. 1 of the drawings I have illustrated my improved planter mechanism in operative relation to an ordinary cultivator, in which 1 designates the implement-beam; 2, the handles; 3, the stocks, and 4 the shovels. I would have it understood that my invention is not restricted to this particular type of cultivator, as it is evident that the mechanism for replanting corn may be used in connection with any construction of cultivator implement. In this figure of the drawings the planter mechanism is illustrated as mounted to deliver the corn in rear of the front shovel; but, as before stated, this mechanism may be arranged on the implement in advance of all of the shovels, to the end that the seed dropped by the planter may be covered by both of the cultivator-shovels.

In the improved planter mechanism forming this invention a hopper 5 is employed. This hopper is preferably, though not necessarily, constructed of sheet metal, and its lower end is closed by a cast-metal bottom plate 6, which is secured removably in place to permit access to the seed-dropping plate for the purpose of changing the plates and of cleaning the working parts of the planter mechanism. In the drawings the bottom plate 6 is shown as provided with a series of notches 7 in its edge, and this plate is engaged by a like series of lugs 8 on the inner surface of the hopper-shell, at the lower edge thereof. The lugs 8 are spaced on the hopper-shell at intervals corresponding to the notches 7 in the bottom plate, and in assembling the hopper and plate the operator adjusts said plate to bring the notches therein in line with the lugs 8, after which the plate is forced upwardly in a position for the lugs to pass through the notches, and then the plate is turned slightly to cause the notches to disaline with the lugs, said lugs resting against the imperforate part of the bottom plate and supporting the latter firmly in place within the hopper. Said bottom plate is formed with a discharge-opening 9 and with a depending flange or nozzle 10, which is coincident with said opening 9, and this nozzle provides for the convenient attachment of a conducting tube or hose 11, the latter extending below the hopper and plate 6 to discharge into a metallic shoe 12. This shoe lies in rear of the stock and shovel of the cultivator, as shown by the drawings, and said shoe is equipped with an upwardly-extending tongue 13. Through the tongue passes the bolt 14, which secures the shovel to the stock, and a single bolt is thus used to fasten the shovel to the front side of the stock and the shoe to the rear side of the stock. The tube or hose 11 plays or telescopes in the metallic shoe, and said tube and shoe conduct the grain close to the ground or row to enable the seed to be deposited at the proper place on the row without scattering. At one side of the delivery-opening 9 in the bottom plate is a slot or recess 15, which accommodates a spring, presently described, that serves to check the oscillatory motion of the seed-dropping plate 16. This dropping-plate 16 is cast in a single piece of metal, with a series of vertical holes 17, and on the under side of the plate is a series of flanges or bosses 18, which are coincident with the series of holes 17, thus providing elongated openings in the dropping-disk. This plate or disk 16 is arranged loosely within the lower part of the hopper and above the bottom plate 6, and the bosses or flanges 18 of said disk rest upon the bottom plate 6 to slide or move freely over the latter. The dropping-disk 16 is arranged or confined within the hopper in a position for its openings 17 to be brought into coincidence successively with the delivery-opening 9 and nozzle 10 of the bottom plate 6, and this dropping-disk 16 has combined therewith devices which are actuated manually to give a step-by-step feed to the disk, whereby the contents of the openings 17 in the dropping-disk are delivered successively to the opening 9 in the bottom plate. This dropping-disk is formed with a central bearing or socket 19, which lies within the plane of the circular series of apertures 17, and in this bearing or socket 19 is fitted the lower extremity of an actuating-shaft 20. Said shaft 20 extends vertically through the hopper and the head at the upper end thereof, and the lower extremity of the shaft is connected loosely to the dropping-disk 16, so that the shaft may play or turn independently of the feed motion imparted to the dropping-disk. The socket 19 is open at $19^a$ for the escape of any refuse which may accumulate therein.

The weight of the grain contained within the hopper is borne by a supporting-plate 21, which is cast in a single piece of metal in the disk form represented by Fig. 6, and this plate is arranged within the hopper to occupy a horizontal position above the oscillating dropping-disk 16. The supporting-plate is secured firmly to the hopper-shell by rivets or other suitable fasteners, and in said plate is an enlarged slot or opening $21^a$, which lies within an imperforate rim or flange 22. The supporting-plate is solid for about one-half of its area, and the slot or opening $21^a$ lies over the bottom plate 6, out of line with the delivery-opening 9 and nozzle 10 thereof, the area of the slot or opening $21^a$ being sufficient to expose a number of the seed-openings 17 in the dropping-plate 16 for the purpose of permitting the seed to pass from the hopper through the slot or opening $21^a$ and enter a number of the openings in the dropping-disk. The solid part of the supporting-plate 21 is extended to form the lug 23, having an opening which lies at the center of the plate 21 and accommodates the shaft 20, which passes freely or loosely through said opening. The lower side of this cast-metal plate 21 has a chamber 24, that accommodates an oscillating arm which is carried by the shaft, and against one or both edges of the opening $21^a$ in this plate is secured a packing-strip 25, of rubber, leather, or other suitable material, which is arranged to sweep the face of the dropping-disk 16 and prevent the seed from passing into the chamber 24 of the plate 21.

The vibrating feed-arm 26 is cast in a single piece of metal with an angular or polygonal guide-opening 27 near its free end, and this arm 26 is secured to the shaft 20 to extend radially therefrom and lie in the chamber 24 of the supporting-plate 21. The arm is adapted to oscillate or move with the shaft 20, and it carries a feed-dog 28, which is loosely fitted in the opening 27 of said feed-arm. This dog 28 is square or polygonal to correspond to the opening 27, and at its upper end said dog has an enlarged head 29, arranged to rest upon the arm and limit the downward movement of the dog to prevent it from becoming disengaged with the arm. Said dog is adapted to play freely in a vertical direction within the opening in the arm; but normally its weight depresses the dog to have its lower end enter one of the openings 17 in the dropping-disk 16. The lower extremity of the dog is beveled in an upward and rearward direction; but its active face is vertical, so that on the movement of the arm in a direction to advance the feed-disk this vertical face will engage with the wall of one of the openings 17 to properly move the disk 16 with the arm 26. On the reverse movement of the arm 26 with the shaft 20 the beveled end of the gravity-dog will ride against the wall of the opening in the seed-disk, thus lifting the gravity-dog sufficiently for it to clear the opening and permit the arm 26 and the shaft 20 to be returned to their normal positions.

The forward movement of the dropping-disk 16 under the impulse of the feed-arm and gravity-dog when actuated by the shaft 20 is limited or arrested by a check-spring 30, which is arranged or housed within the slot or recess 15 of the bottom plate 6. The free end 31 of this check-spring is inclined upwardly into the path of the openings in the dropping-disk 16, and when the disk is moved to a position where one of its openings filled with grain is coincident with the opening 9 in the bottom plate 6 the spring engages with one of the openings in advance of the opening which is filled with grain and with the same opening with which the feed-pawl is in engagement, thus retarding or checking the movement of the disk 16. This spring 30 is fastened in place by a rivet or screw 32, attached to the bottom plate.

The movement of the shaft 20 in a direction to actuate the feed-arm and the disk 16 is effected by devices operated by hand; but the reverse movement of the shaft to restore the feed-arm to its normal position and make the gravity-pawl engage with the next opening in the seed-opening disk is effected automatically by a return-spring 33. This spring 33 is shown as housed or arranged within the hopper above the supporting-plate 21; but, if desired, the spring may be arranged within the hopper below the head 36 thereof. The spring is coiled around the shaft 20 to have its lower end fastened to the fixed supporting-plate 21; but the upper end of the spring is secured to a collar 34, which is slipped on the shaft 20 and held firmly in position thereon by a binding-screw 35. It is evident that the collar may be adjusted on the shaft to increase the tension of the spring, after which the collar should be clamped in place by the binding-screw.

The head 36 of the hopper is cast in a single piece of metal, and it is attached to the hopper-shell by rivets or screws, so as to effect a firm union between said head and the hopper. This head 36 is formed with a filling-opening 36$^a$ and with a shaft-opening 37, and the opening 36$^a$ is closed by a cover or lid 38, which is pivoted at 39 to the head. The head is also provided with a lug or short post 40, one edge of which is beveled or inclined, as shown by Fig. 7, and this lug or post serves as a stop to an actuating-lever 41 for the shaft 20 and as a means for the attachment of a brace-arm 46. The actuating-lever 41 is secured firmly to the end of the shaft 20, which passes loosely through the opening 37 in the head 36, and the short arm 42 of this actuating-lever is adapted to abut against the beveled face of the lug 40, thus limiting the movement of the lever 41 and the shaft 20 under the recoil action of the return-spring 33. The long arm of the actuating-lever is connected by a wire or link 43 to an operating-lever 44, which is fulcrumed on an arm 45, that is fixed to one of the plow-handles, so as to be within convenient reach of the operator. The brace-arm 46 is attached by a pivot 47 to the post or lug 40, so as to permit the hopper to swing in a backward direction.

The cultivator implement may be used in the ordinary way for cultivating the growing crop; but when the operator observes a vacant space in the row or hill the implement is swung to one side, so as to present the metallic shoe 10 over the vacant space. The operator now moves the lever 44 by hand, and this lever, through the connecting-wire 43, moves the lever 41 to turn the shaft 20 a proper distance. The shaft moves the feed-arm 26 and its pawl engages with one of the openings in the dropping-disk 16. The movement of the arm and pawl impels the dropping-disk a distance equivalent to the space between the centers of two adjacent openings 17 therein, and one opening filled with grain is thus brought in alinement with the delivery-opening 9 in the bottom plate 6, whereby the seed is discharged, through the nozzle 10, the hose, and the shoe, upon the ground. The lever 44 being released, the spring 33 returns the shaft to its normal position, thus bringing the long arm of the lever 41 in contact with the post or stud 40 and moving the feed-arm 26 in a backward direction; but on the forward movement of the lever 41 its short arm 42 abuts against the stop, whereby the stop and lever coact to limit the movement of the lever in either direction. The beveled face of the dog 28 rides against the edge of the seed-opening in the disk 16, traversing the imperforate part of the seed-disk and dropping into the next opening of the disk 16. The parts are thus placed in condition for the next operation.

It is evident that the lid or cover on the head of the hopper may be swung to one side to expose the opening in said head and permit the supply of seed to be replenished.

The dropping devices of my planter are placed as near the ground as possible to insure a quick dropping of the seed without the employment of secondary dropping devices. The dropping-disk is a plain casting minus ratchet devices to coact with the feed arm and pawl, thus dispensing with extra labor in fitting the disk for service in the planter. This disk has a series of seed-holes which are deep enough to allow the dog to engage with the edges of the seed-openings near the upper face of the disk, while the check-spring catches in the bottom part of the seed-holes. I have arranged the devices to have the feed-arm move in a forward direction the same distance each time the rock-shaft is actuated, and the check-spring acts to retard the disk and prevent the latter from traveling farther forward than the arm and pawl would have a tendency to carry it. In order to insure against imperfections in the spacing of the holes in the dropping-disk, I give to the feed-arm more movement than the dropping-disk, but said arm does not go forward beyond a fixed point at any time, while it may travel in a backward direction for a distance to have the pawl drop at or near the center of the seed-opening in the dropping-disk, so that in making the forward movement of the feed-arm the seed-disk would not begin to travel until the pawl is brought in contact with the front wall of the seed-hole in the dropping-disk.

In the operation of the dropping mechanism the feed-pawl and the check-spring engage with the empty seed-opening of the disk in advance of the hole which is filled with grain, the ends of the dog and the check-spring being in the same perpendicular plane at the completion of the movement of the seed-disk in a forward direction. The check-spring prevents any backward movement of the dropping-disk due to friction between the disk, the feed-arm, and the pawl. The operating devices for the shaft being all disposed at the upper end of the hopper allows the bottom of the hopper to be closed and free from obstruction from any cause. The employment of the flexible hose or tube at the bottom of the hopper permits the bottom plate 6 to be removed in order to replace a seed-dropping plate having holes of a given number with another plate having the same number of holes; but the holes in the last-named plate may be of greater or less diameter, so as to vary the capacity of the different disks. By providing the lugs on the hopper and the notches in the bottom plate it is not possible to fit the plate improperly in place in the bottom of the hopper. The lower end of the operating-shaft does not extend through the dropping-plate, but the hole is contracted to allow dust and dirt to be discharged from the stem-bearing in the dropping-plate for the shaft. In replacing the dropping-disk it sometimes happens that the feed-pawl and check-spring do not assume their proper positions; but a single movement of the lever devices will properly aright them. The gravity-dog is prevented from dropping too low by the head which rests upon the arm, and it cannot lift high enough to free the arm, because the head will strike against the solid part of the supporting-plate. To remove the shaft from the hopper, the lever 41 is detached, the screw is loosened in the spring-collar, and the bottom plate is removed, after which the shaft 20 can be removed without taking out the supporting-plate.

Changes may be made in the form of some of the parts while their essential features are retained and the spirit of the invention embodied. Hence I do not desire to be limited to the precise form of all the parts as shown, reserving the right to vary therefrom.

Having thus described the invention, what I claim is—

1. The combination with a hopper, of a shaft therein, a dropping-disk having a plurality of openings, an arm carried by the shaft to travel therewith, a gravity, beveled nose, feed-pawl mounted loosely on the arm and arranged to drop into engagement with an opening in the dropping-disk, manually-operative means for turning the shaft in one direction and moving the dropping-disk through the medium of said arm and pawl, and a spring for returning the shaft and arm in an opposite direction and presenting the pawl in position to engage with the successive opening of the dropping-disk, substantially as described.

2. The combination of a hopper having a removable bottom plate, a supporting-plate secured within the hopper in spaced relation to the bottom plate and having a vertical opening or slot which is out of line with a discharge opening or nozzle in the bottom plate, a perforated dropping-plate between the bottom plate and the supporting-plate, a shaft fitted loosely in the supporting and dropping plates, and a feed mechanism carried by the shaft below the supporting-plate and engaging with the dropping-plate to move the latter with a step-by-step motion, substantially as described.

3. The combination with a hopper, of a dropping-disk, a shaft loosely connected to said disk, an arm carried by the shaft, a gravity-pawl mounted loosely in the arm and engaging with the disk, and manually-operated devices connected with the shaft to rock or turn the latter, substantially as described.

4. The combination with a hopper, of a dropping-disk arranged therein and provided with the seed-openings, a shaft loosely connected with the disk, a feed-arm fast with the shaft and having a gravity-pawl arranged to engage with the openings in the disk, a return-spring connected with the shaft, and levers attached to the shaft and coacting with a stop to limit the movement of the shaft in either direction, substantially as described.

5. The combination with a hopper, of a seed-dropping disk arranged therein, a shaft loosely connected with said disk, a feed-arm fast with the shaft and carrying the pawl which engages with the disk, a check-spring to limit the movement of the disk under the influence of the pawl and arm, and means for rocking or turning the shaft, substantially as described.

6. In a planter, a hopper provided with a fixed supporting-plate having an opening or slot and a removable bottom connected to the hopper below the plate, in combination with a dropping-disk arranged between said supporting-plate and the bottom plate, and means for actuating the dropping-disk, substantially as described.

7. In a planter, a hopper provided with a fixed supporting-plate having a chamber in its lower side and a vertical slot or opening, and a bottom plate secured removably to the hopper below the supporting-plate, in combination with a dropping-disk arranged between the supporting-plate and the bottom plate, a shaft, and an arm fast with the shaft and projecting therefrom into the chamber of the supporting-plate, said arm carrying means for engagement with the dropping-plate, substantially as described.

8. In a planter, a hopper provided with a fixed supporting-plate and with the lugs, a bottom plate provided with notches and fitted in the hopper to be held in place by the lugs thereof, and a seed-dropping disk confined between the supporting-plate and the bottom plate, in combination with a shaft, a step-by-step feed device between the shaft and dropping-disk, and means for actuating the shaft, substantially as described.

9. The combination with a hopper, and a stock of a cultivator implement, of a shoe having a tongue fastened to said stock, a bottom plate secured removably in the hopper and having a depending nozzle, a conducting tube or hose attached to said nozzle of the bottom plate and fitted loosely in the shoe to be withdrawable therefrom with the bottom plate when the latter is detached from the hopper, and seed-dropping devices within said hopper, substantially as described.

10. In a planter, a hopper, a head secured to the hopper and provided with a stop-lug, a dropping-disk within the hopper, and a shaft extending through the hopper, in combination with an actuating-lever fixed to the shaft and arranged to engage with the stop-lug, a hand-lever connected with the actuating-lever, and a spring to return the shaft to a position for its actuating-lever to contact with the stop-lug, substantially as described.

11. In a planter, a hopper and a head therefor provided with a stop-lug, in combination with a shaft having a lever to engage with the stop-lug, an arm pivoted to the stop-lug, and dropping devices actuated by the shaft, substantially as described.

In testimony that I claim the foregoing as my own I have hereto affixed my signature in the presence of two witnesses.

GEORGE C. FLAGG.

Witnesses:
L. A. ETZOLD,
ABE K. STOUFEN.